(12) United States Patent
Yamaguchi

(10) Patent No.: US 7,453,666 B2
(45) Date of Patent: Nov. 18, 2008

(54) MAGNETIC DISK DRIVE DEVICE AND METHOD OF MANUFACTURING THE SAME

(75) Inventor: Satoshi Yamaguchi, Shatin (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 346 days.

(21) Appl. No.: 11/367,150

(22) Filed: Mar. 1, 2006

(65) Prior Publication Data

US 2006/0203377 A1    Sep. 14, 2006

(30) Foreign Application Priority Data

Mar. 1, 2005   (JP) .............................. 2005-055375

(51) Int. Cl.
*G11B 5/012* (2006.01)
(52) U.S. Cl. .................................. 360/97.01
(58) Field of Classification Search ............... 360/97.01
See application file for complete search history.

(56) References Cited

U.S. PATENT DOCUMENTS

| | | | | |
|---|---|---|---|---|
| 6,831,810 | B1 * | 12/2004 | Butler et al. | 360/97.01 |
| 7,369,355 | B2 * | 5/2008 | Ho et al. | 360/97.01 |
| 2003/0026037 | A1 * | 2/2003 | O'Sullivan et al. | 360/97.01 |
| 2003/0218827 | A1 * | 11/2003 | Teo et al. | 360/97.01 |
| 2005/0094312 | A1 * | 5/2005 | Sato | 360/97.01 |
| 2005/0099721 | A1 * | 5/2005 | Ho et al. | 360/97.01 |
| 2005/0105211 | A1 * | 5/2005 | Ho et al. | 360/97.01 |

FOREIGN PATENT DOCUMENTS

JP    6-215513    8/1994

* cited by examiner

*Primary Examiner*—Allen T Cao
(74) *Attorney, Agent, or Firm*—Jordan and Hamburg LLP

(57) ABSTRACT

A magnetic disk and spindle motor are mounted in a housing member. A support arm is freely rotatably mounted on a cover member. A suspension has a dimple (first mark) indicating the mount position of the magnetic head slider and a through hole (second mark) formed at any different position form the dimple. The cover member has measuring holes, through which the respective marks are observed from the opposite side to the support arm mount surface.

13 Claims, 8 Drawing Sheets

MAGNETIC DISK DRIVE DEVICE AND METHOD OF MANUFACTURING THE SAME

BACKGROUND OF THE INVENTION

1. Field of the Invention

The present invention relates to a magnetic disk drive device and a method of manufacturing the magnetic disk drive device.

2. Description of the Related Art

In a magnetic disk drive, that is, a hard disk drive (HDD) device, a magnetic head slider provided to the tip portion of a suspension of a head gimbal assembly (HGA) is floated from the surface of a rotating magnetic disk, that is, a hard disk, and under this state, recording into the magnetic disk and/or reproduction from the magnetic disk is carried out by a thin film magnetic head element mounted on the magnetic head slider.

In general, the outer shape of the HDD device is formed by a housing member and a cover member, and various constituent parts such as a magnetic disk, a motor for driving the magnetic disk, HGA containing a magnetic head slider, a support arm for supporting HGA, etc. are accommodated in the HDD device.

In the conventional HDD device, almost all of these constituent parts are secured to the housing member. The cover member covers the opening portion of the housing member, and plays only a role of hermetically sealing the HDD device. The conventional HDD device thus constructed is disclosed in JP-A-6-215513.

Therefore, the magnetic head slider disposed so as to face the magnetic disk is secured to the tip portion of the suspension of HGA in advance, and installed in the housing member. Thereafter, a performance test of the magnetic head slider is executed. In general, the yield of the magnetic head slider is low (in other words, defective product rate is high), and when the magnetic head slider is judged as being defective, it is necessary to detach all the parts of HGA from the housing member and exchange them.

In addition, the magnetic head slider is degraded in performance because dust, etc. are attached to the magnetic head slider, and thus it is necessary to handle it in a highly precise clean room. Accordingly, with respect to the step of mounting HGA in the housing member, it is required to carry out the step concerned in a highly precise clean room.

Furthermore, there are still a step of installing HGA into the housing member, etc. after the magnetic head slider is mounted on the suspension of the HGA concerned, and thus damage of the magnetic head slider due to electrostatic discharge (ESD) in the subsequent steps frequently occurs.

Accordingly, the conventional magnetic disk drive device is low in productivity, and this is an obstacle to reduction of the product cost.

SUMMARY OF THE INVENTION

The present invention has been implemented in view of the foregoing situation, and has an object to provide a magnetic head slider that can enhance the productivity and reduce the damage rate of a magnetic head slider by ESD or the like, and a method of manufacturing the magnetic head slider.

In order to attain the above object, according to the present invention, a magnetic disk drive device comprising:

a housing member having an opening on the front surface thereof;

a cover member for covering the opening portion of the front surface of the housing member;

a head gimbal assembly containing a magnetic head slider and a suspension for supporting the magnetic head slider;

a support arm for supporting the head gimbal assembly;

a magnetic disk provided so as to face the magnetic head slider; and a motor for rotating the magnetic disk, is characterized by comprising the following first to fourth constituent elements:

first, the magnetic disk and the motor are mounted in the housing member;

secondly, the support arm is freely rotatably mounted on the cover member;

thirdly, the suspension has a first mark indicating the mount position of the magnetic head slider, and a second mark set at any different position from the first mark; and fourthly, the cover member has a measuring hole through which the first and second marks are observed from the opposite side to the support arm mount surface.

Here, it is preferable that a positioning hole into which a positioning pin is inserted is formed in each of the cover member and the suspension. The positioning hole of the cover member may be formed at any position within a rotatable range of the suspension supported on the support arm so as to face the positioning hole of the suspension.

The measuring hole is preferably formed at a position at which the first mark and the second mark can be observed from the opposite side to the support arm mount surface under the state that the positioning holes of the cover member and the suspension are arranged so as to face each other and the positioning pin is inserted in each of the positioning hole.

In the above-described construction, for example, a dimple formed on the suspension may be used as the first mark, and a through hole formed in the suspension may be used as the second mark.

In some cases, a projecting called as a dimple for supporting the magnetic head slider from the back side or a through hole used for positioning or the like in the manufacturing step is formed in advance. By using the dimple and through hole formed in the suspension in advance as the first mark and the second mark as described above, the improvement of the suspension or the complexity of the structure of the suspension can be avoided when the present invention is applied.

The measuring hole may be constructed by a first measuring hole through which the first mark is observed from the opposite side to the support arm mount surface, and a second measuring hole through which the second mark is observed from the opposite side to the support arm mount surface. Furthermore, the measuring hole may be constructed by an elongated common measuring hole through which the first and second marks are observed from the opposite side to the support arm mount surface.

The positioning hole and the measuring hole formed in the cover member are sealed in the completed magnetic disk drive device, whereby the inside of the device which is covered by the housing member and the cover member is hermetically sealed and invasion of dust into the device is prevented.

According to the present invention thus constructed, the head gimbal assembly containing the magnetic head slider and the suspension is secured to the cover member by the support arm for supporting the head gimbal assembly. Furthermore, the magnetic disk and the motor are secured to the housing member, and thus a fabrication work for the head gimbal assembly can be performed separately from the housing member in which the magnetic disk exists. Therefore, the degree of freedom of devices and jigs required for the work is increased, and the efficient work can be implemented.

When a defective magnetic head slider is detached from the head gimbal assembly and exchanged by a new one, the exchange work may be carried out under the state that the housing member and the cover member are separated from each other, so that the exchange work of the magnetic head slider can be easily and efficiently carried out without contaminating the magnetic disk.

Furthermore, by preferentially mounting the gimbal assembly excluding the magnetic head slider on the cover member and then mounting the magnetic head slider on the suspension, the step of fabricating the head gimbal assembly to the cover member is not required to be carried out in a highly precise clean room. In addition, the number of operations after the magnetic head slider is mounted on the suspension is reduced, and thus the damage of the magnetic head slider by ESD or the like can be suppressed.

According to the present invention, the first and second marks provided to the suspension can be observed through the measuring hole provided to the cover member. Therefore, as in the case of the manufacturing method described below, the magnetic head slider can be mounted at a predetermined position of the suspension with high precision even after the suspension is mounted on the cover member.

That is, a method of manufacturing a magnetic disk drive according to the present invention comprises:

a housing member side assembly step of mounting a magnetic disk and a motor to a housing member;

a cover member side assembly step of mounting on a cover member a support arm to which a head gimbal assembly in which a magnetic head slider is not mounted is secured;

a slider mount step of mounting the magnetic head slider in the head gimbal assembly mounted on the cover member; and a sealing step of fabricating the cover member to the housing member so that the cover member covers an opening portion of the front surface of the housing member, wherein the slider mount step contains the following first to fourth operations.

First, the support arm to which the head gimbal assembly in which the magnetic head slider is not mounted is secured is fixed at any position preset on the cover member.

Secondly, first and second marks set in a suspension are measured through a measuring hole from the opposite side to the support arm mount surface on the cover member.

Thirdly, the orientation of the suspension and the mount position of the magnetic head slider on the suspension concerned are recognized on the basis of the measurement result of the first and second marks.

Fourthly, the magnetic head slider is mounted on the suspension on the basis of the mount position of the magnetic head slider on the orientation of the suspension and the mount position of the magnetic head slider on the suspension.

Here, the first and second marks set on the suspension are detected by an image reading camera set up at the opposite side to the support arm mount surface of the cover member.

Furthermore, the magnetic head slider before it is mounted on the suspension is detected by the image reading camera, and the orientation and position of the magnetic head slider are recognized, so that the magnetic head slider can be mounted on the suspension on the basis of the recognition result.

It is preferable that the magnetic head slider is mounted on the suspension by soldering. This enables a defective magnetic head slider to be easily detached from the suspension by merely melting the solder, and the exchange work can be facilitated.

Furthermore, by inserting a hold sealing step of sealing the positioning hole and the measuring hole formed in the cover member, the inside of the device covered by the housing member and the cover member is hermetically sealed and invasion of dust into the inside can be prevented.

As described above, according to the present invention, the head gimbal assembly is mounted on the cover member, so that the productivity can be enhanced, and also the damage rate of the magnetic head slider by ESD or the like can be reduced.

DETAILED DESCRIPTION OF THE PREFERRED EMBODIMENTS

Preferred embodiments according to the present invention will be described in detail with reference to the drawings.

Figure 1:
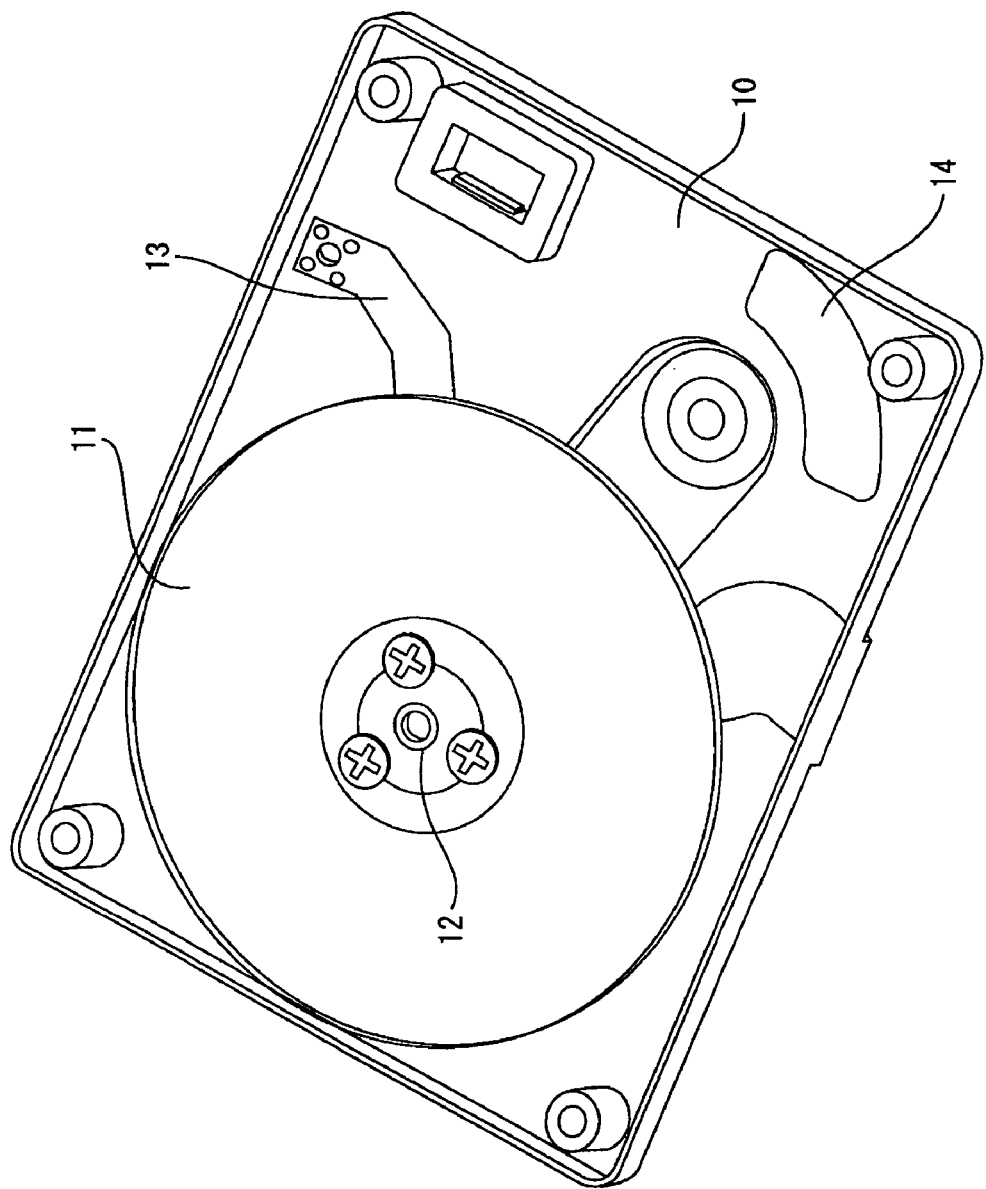
FIG. 1 is a perspective view showing the construction of a housing member side of a magnetic disk drive device (HDD device) according to an embodiment of the present invention.

In FIG. 1, 10 represents a housing member whose front surface is opened, 11 represents a magnetic disk, and 12 represents the rotational shaft of a spindle motor. Although the spindle motor is not shown, it is installed in the housing member 10, and the magnetic disk 11 is mounted on the rotational shaft 12 of the spindle motor. The magnetic disk 12 rotates at a high speed by the rotational driving force of the spindle motor. 13 represents a wire conductor for supplying power to the spindle motor. 14 represents a part of a yoke constituting a voice coil motor (VCM) described later.

In FIGS. 2, 3A and 3B, 20 represents a cover member for covering the opening portion of the front surface of the housing member 10, and 21 represents a support arm and is freely rotatably mounted on a horizontal rotational shaft 22 fixed to the cover member 20. 23 represents a load beam and mounted to the tip portion of the support arm 21. 23a represents a lift tab, and it is provided to the tip of the load beam 23, and has a function of separating the head gimbal assembly from the surface of the magnetic disk 11 under non-operation. 24 represents a flexure and it is mounted on the load beam 23. 25 represents a magnetic head slider, and it is mounted to the tip portion of the flexure 24. A magnetic head element is formed at a part of the magnetic head slider 25.

Figure 3A:
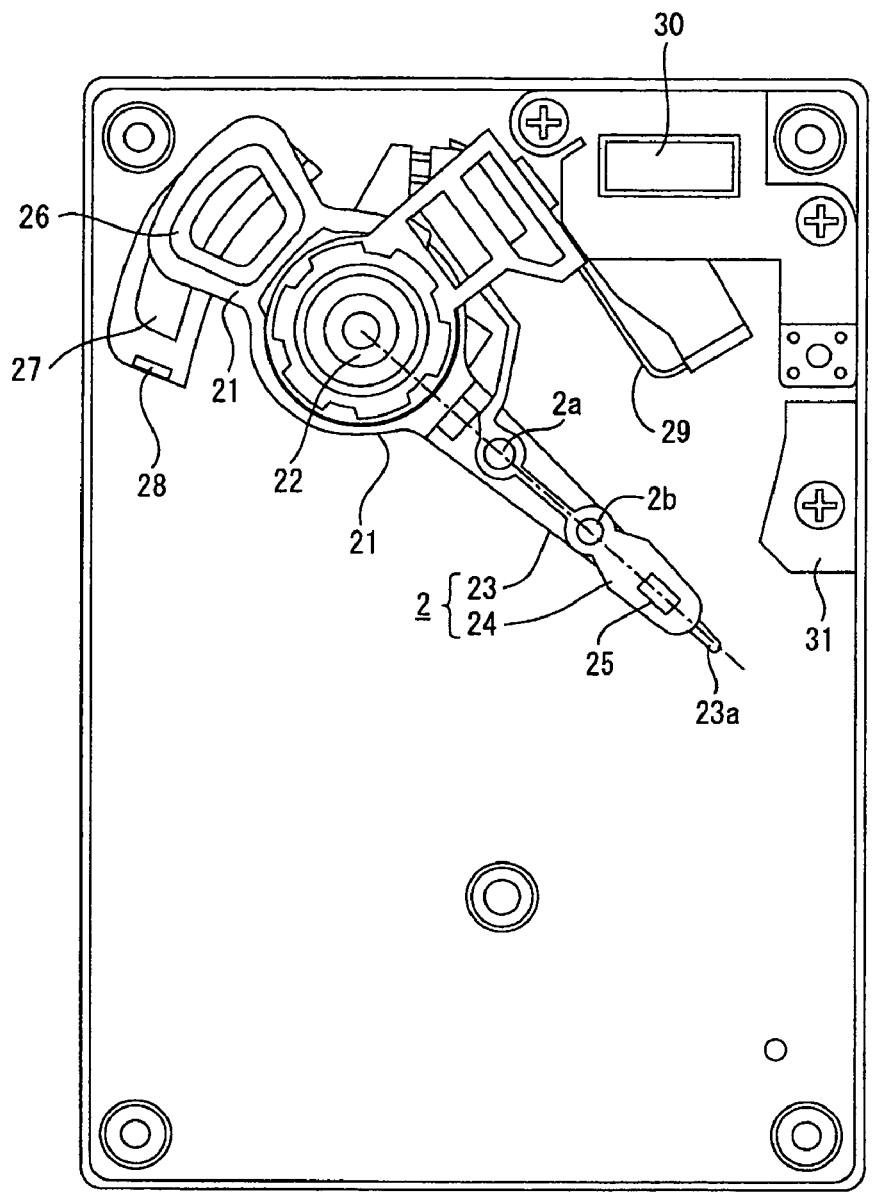
FIG. 3A is a plan view showing the construction of the cover member side of the magnetic disk drive device (HDD device) according to the embodiment of the present invention.
Figure 3B:
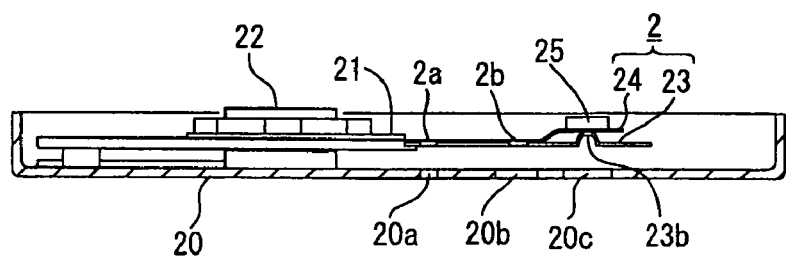
FIG. 3B is a side cross-sectional view.

Here, in this embodiment, the flexure 24 is formed of a metal plate having elasticity, and a soft tongue portion (not shown) is formed at the tip portion of the flexure 24. The magnetic head slider 25 is softly supported by the tongue portion, whereby the floating posture of the magnetic head slider 25 is stabilized. Furthermore, a projection called as a dimple 23b is formed at the tip portion of the load beam 23 as shown in FIG. 3B. This dimple 23b has a function of supporting the enter portion of the mount position of the magnetic head slider 25 from the back side. Accordingly, the position at which the dimple 23b is formed faces the center of the mount position of the magnetic head slider 25. As not shown, a trace conductor (wire member) is provided to the flexure 24.

The suspension 2 is constructed by the load beam 23 and the flexure 24 described above, and the head gimbal assembly is constructed by the suspension 2, the magnetic head slider 25 and the trace conductor.

26 represents a coil portion of the voice coil motor, and it is mounted to the rear end portion of the support arm 21. 27 represents a magnet portion of the voice coil motor, and it is mounted on the cover member 20. 28 represents the remaining part of the yoke constituting the voice coil motor. The voice coil motor constructed by the yoke portions 14, 28, the coil portion 26 and the magnet portion 27 serves as a driving source for rotating the support arm 21 around the horizontal rotational shaft 22.

29 represents an external wire conductor which is electrically connected to the magnetic head slider 25, and it is constructed by a flexible print circuit (FPC) equipped with an IC chip. The external wire conductor 29 is connected to a trace conductor (not shown) of the flexure 24. 30 represents a connector portion containing a head amplifier for amplifying a signal from the magnetic head slider. 31 represents a lamp provided at an evacuation position of the head gimbal assembly, and the lift tab 23a is mounted thereon under non-operation. The connector portion 30 and the lamp 31 described above may be provided at the housing member 10 side, for example.

Figure 4:
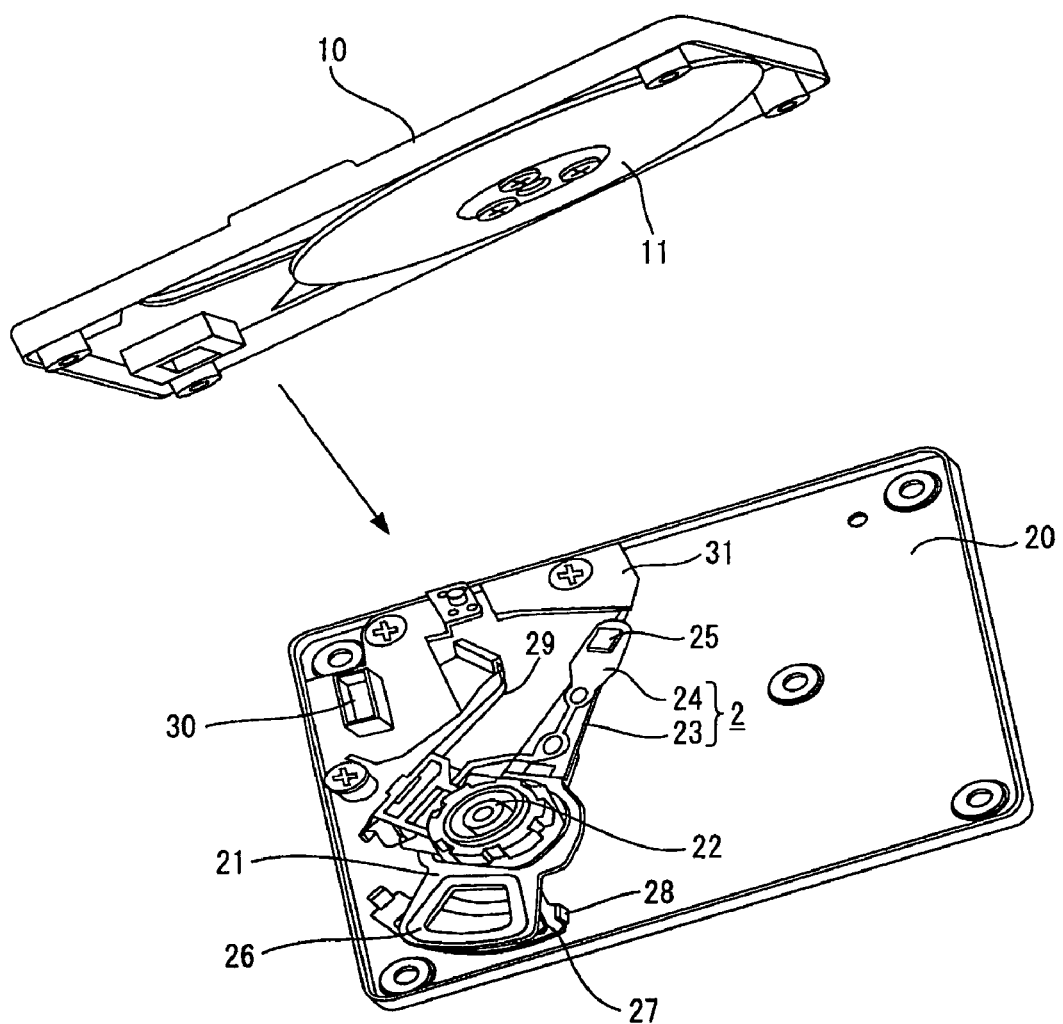
FIG. 4 is an exploded perspective view showing an aspect that a magnetic disk drive device is fabricated by combining a housing member and a cover member.

FIG. 4 is an exploded perspective view showing an aspect that the magnetic disk drive device is fabricated by combining the housing member and the cover member.

As shown in FIG. 4, the magnetic disk 11, the spindle motor, a part 14 of the yoke of the voice coil motor, etc. are mounted in the housing member 10 in advance, and further the horizontal rotational shaft 22, the support arm 21, the suspension 2 comprising the load beam 23 and the flexure 24, the trace conductor (not shown), the magnetic head slider 25, the coil portion 26, the magnet portion 27 and the remaining part 28 of the yoke of the voice coil motor, the external wire conductor 29, the connector portion 30, the lamp 31, etc. are mounted on the cover member 20 in advance.

The cover member 20 is assembled with the housing member 10 so as to cover the opening portion of the front surface of the housing member 10, thereby hermetically sealing the inside and fabricating the magnetic disk drive device. In the assembly body, the magnetic head slider 25 in the device is movable on the virtual plane facing the magnetic disk 11 by the driving force of the voice coil motor.

Figure 5:
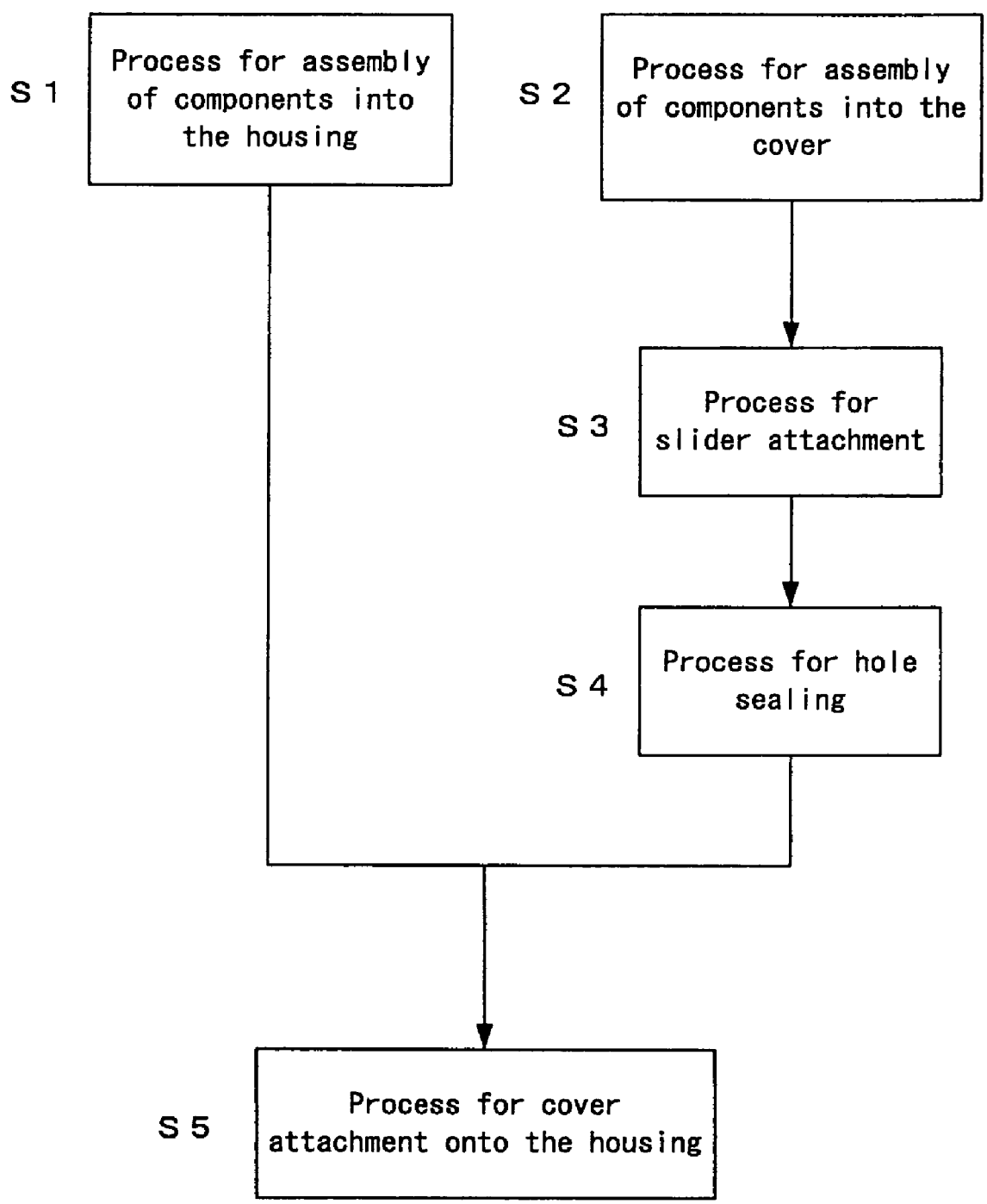
FIG. 5 is a flowchart showing a method of manufacturing a magnetic disk drive device according to this embodiment.

FIG. 5 is a flowchart showing the method of manufacturing the magnetic disk drive device according to the embodiment.

First, the motor assembly comprising the spindle motor, the magnetic disk 11, etc., a part 14 of the yoke of the voice coil motor and the other required parts are mounted in the housing member 10 in advance (step S1: housing member side assembly step).

A head arm assembly (HAA) comprising the support arm to which the head gimbal assembly excluding the magnetic head slider 25 is secured, the horizontal rotational shaft 22, the coil portion 26 of the voice coil motor, etc., a VCM yoke assembly comprising the magnet portion 27 of the voice coil motor and the remaining part 28 of the yoke, the external wire conductor 29 containing the connector portion 30 and the other required parts are mounted in the cover member 20 (step S2: cover member side assembly step).

The cover member side assembly step is the step before the magnetic head slider 25 is mounted on the suspension 2, and thus the work for this step can be also executed at the external of a clean room or in a clean room to which precision is not relatively required, Subsequently, the magnetic head slider 25 is mounted on the suspension 2 (specifically, the tip portion of the flexure 24) of the head gimbal assembly mounted on the cover member 20 (step S3: slider mounting step).

Figure 2:
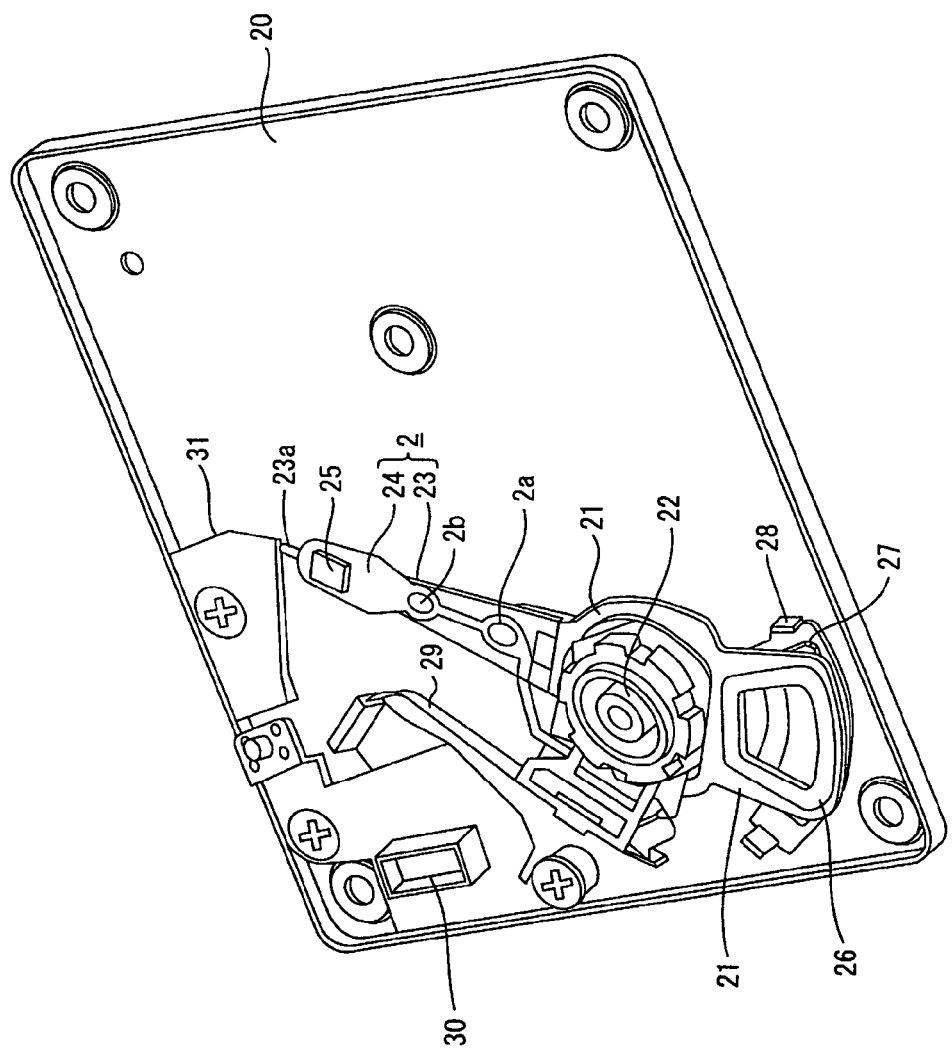
FIG. 2 is a perspective view showing the construction of a cover member side of the magnetic disk drive device (HDD device) according to the embodiment of the present invention.

Here, as shown in FIGS. 2 and 3, a positioning hole 2a and a through hole 2b are formed in the suspension 2 in advance. It has been hitherto general to provide the positioning hole 2a and the through hole 2b for positioning when the suspension 2 is manufactured by combining the load beam 23 and the flexure 24, for example. In general, the positioning hole 2a and the through hole 2b are formed at any positions on the line connecting the center of the mount position of the magnetic head slider 25 and the center of the horizontal rotational shaft 22. In this embodiment, the dimple 23b (first mark) and the through hole 2b (second mark) shown in FIG. 3B are used as the marks for accurately mounting the magnetic head slider 25 at a predetermined position on the suspension 2.

Figure 6:
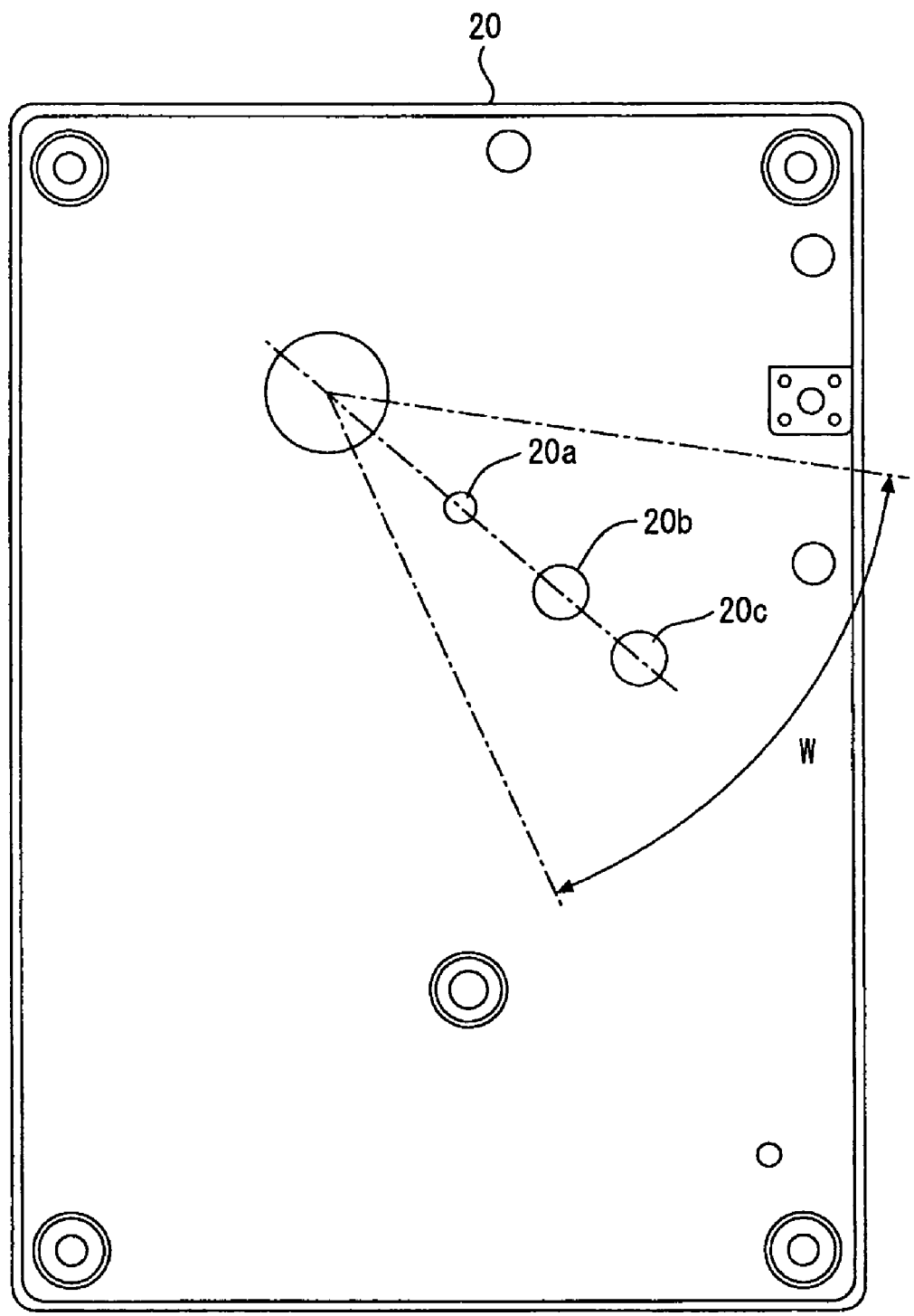
FIG. 6 is a plan view showing the cover member.

Furthermore, as shown in FIG. 6, the positioning hole 20a and the two measuring holes 20b, 20c are formed in the cover member 20. The positioning hole 20a is formed at any position so that it can face the positioning hole 2a of the suspension 2 within the rotational range W of the suspension 2 supported by the support arm 21. Furthermore, the two measuring holes 20b, 20c are formed so that the dimple 23b (first mark) and the through hole 2b (second mark) can be observed from the opposite side to the support arm mount surface under the state that the respective positioning holes 2a of the cover member 20a and the suspension 2 are arranged so as to face each other.

Figure 7A:
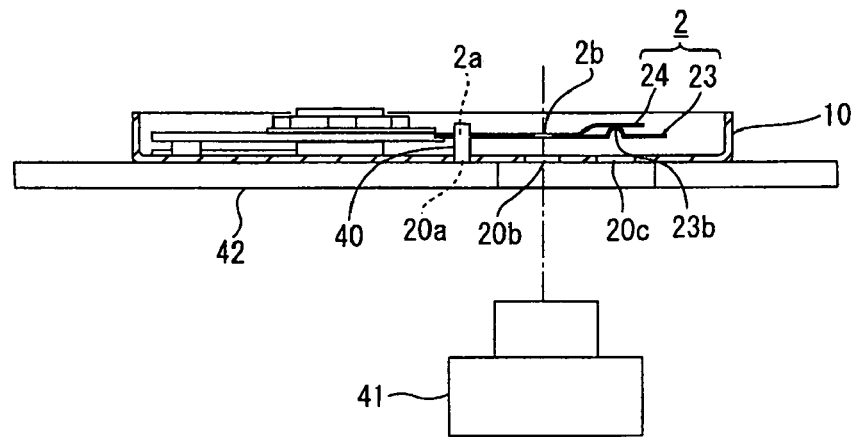
FIGS. 7A, 7B, 7C are diagrams showing the details of a slider mount step.
Figure 7B:
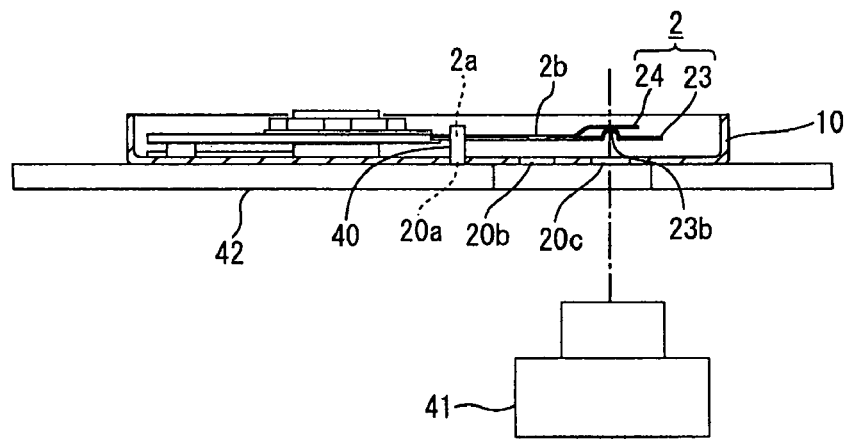
Figure 7C:
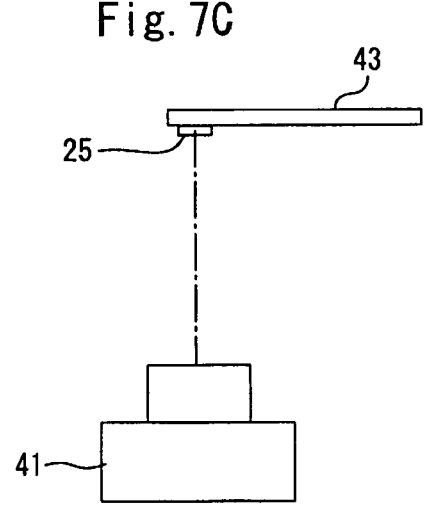

FIGS. 7A, 7B and 7C are schematic diagrams showing the details of the slider mount step.

As shown in FIG. 7A, the respective positioning holes 20a, 2a of the cover member 20 and the suspension 2 are arranged so as to face each other, and the positioning pin 40 is inserted into the respective positioning holes 20a, 2a. As described above, the support arm 21 and the suspension 2 are fixed at any preset position on the cover member 20.

Subsequently, the through hole 2b (second mark) formed in the suspension 2 is measured through the measuring hole 20b from the opposite side to the support arm mount surface of the cover member 20. This measurement is carried out by using an image reading camera 41 such as a CCD camera or the like, and the center position of the through hole 2b is recognized on the basis of the image data thus achieved. The image reading camera 41 is fixed to a preset measurement origin, and the cover member 20 is disposed on a working table movable in parallel such as an X-Y table or the like.

After the position of the through hole 2b is detected, the dimple 23b (first mark) is detected through the measuring hole 20c by the image reading camera 41 while horizontally moving the cover member 20 as shown in FIG. 7B, and the center position of the dimple 23b is recognized on the basis of the image data thus achieved. The detection of the dimple 23b (first mark) may be executed in preference to the detection of the through hole 2b (second mark).

The center position of the dimple 23b (first mark) faces the center of the position at which the magnetic head slider 25 is mounted as described above. Accordingly, if this is recognized, the mount position of the magnetic head slider 25 can be accurately recognized. Furthermore, if any two points (each center position of the dimple 23*b* and the through hole 2*b* in this embodiment) of the suspension 2 can be recognized, the direction of the line connecting the two points can be determined on the basis of the recognition result, whereby the orientation of the suspension 2 can be recognized.

Furthermore, as shown in FIG. 7C, the magnetic head slider 26 fed by the robot arm 43 or the like is detected by the image reading camera 41 to recognize the orientation and position of the magnetic head slider 25. The orientation of the magnetic head slider 25 thus recognized is corrected to be conformed with the orientation of the suspension 2, and also the magnetic head slider 25 is accurately fed and mounted to a predetermined position of the suspension 2 on the basis of the center position information of the dimple 23*b* (first mark) and the position information of the magnetic head slider 25.

As described above, the two marks 23*b*, 2*b* are provided to the suspension 2, and the measuring holes 20*b*, 20*c* are formed in the cover member 20 to observe the marks 23*b*, 2*b*, whereby the magnetic head slider 25 can be accurately mounted to the suspension 2 while mounted on the cover member 20.

Here, the magnetic head slider 25 is mounted on the suspension 2 by solder. With this arrangement, a defective magnetic head slider 25 can be simply detached from the suspension 2 by merely melting the solder, and thus the exchange work can be easily performed.

Returning to FIG. 5, after the slider mounting step is finished, the positioning hole 20*a* and the measuring holes 20*b*, 20*c* formed in the cover member 20 are sealed by tape or the like (step S4: hole closing step). Accordingly, the inside of the device covered by the housing member 10 and the cover member 20 is hermetically sealed, and invasion of dust into the inside can be prevented. The sealing of the positioning hole 20*a* and the measuring holes 20*b*, 20*c* may be carried out at the outer surface side after the cover member 20 is assembled to the housing member 10.

Finally, the cover member 20 is assembled to the housing member 10 so as to cover the opening portion of the front surface of the housing member 10 (step S5: sealing step).

The present invention is not limited to the embodiment described above.

Figure 8:
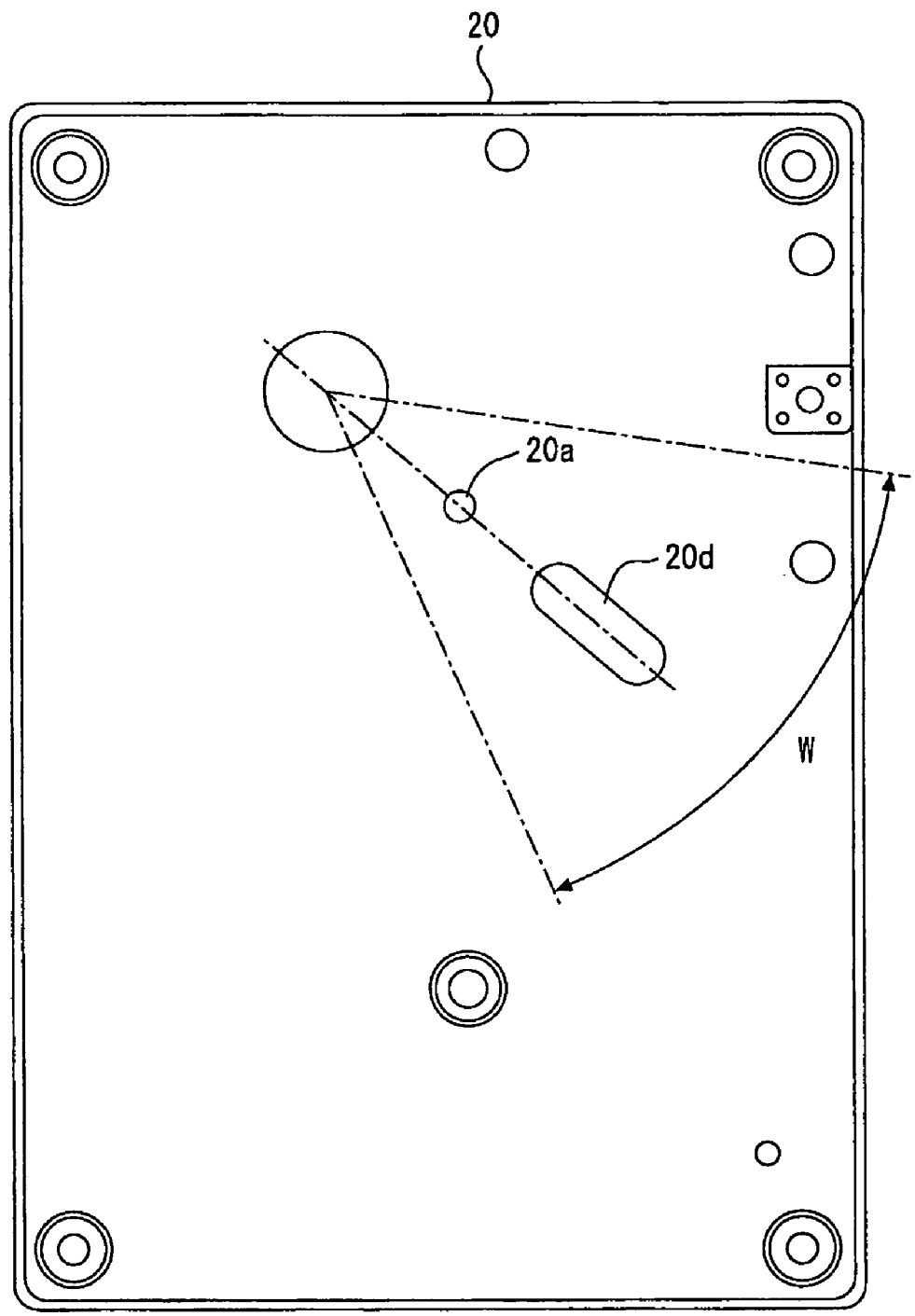
FIG. 8 is a plan view of a cover member which shows a modification of a measuring hole.

For example, as shown in FIG. 8, the measuring holes for observing the dimple 23*b* (first mark) and the through hole 2*b* (second mark) from the opposite side to the support arm mount surface may be constructed by a common measuring hole 20*d* having an elongated shape.

Furthermore, in order to recognize the orientation of the suspension 2, three or more marks may be formed in advance, and also measuring holes through which these marks can be observed from the opposite side to the support arm mount surface may be formed in the cover member 20.

Still furthermore, it is needless to say that the present invention may be applied to various kinds of HDD devices having other structures than the structure described with reference to the above embodiment.

What is claimed is:

1. Magnetic disk drive device comprising:
    a housing member having an opening on the front surface thereof;
    a cover member for covering the opening portion of the front surface of the housing member;
    a head gimbal assembly containing a magnetic head slider and a suspension for supporting the magnetic head slider;
    a support arm for supporting the head gimbal assembly;
    a magnetic disk provided so as to face the magnetic head slider; and
    a motor for rotating the magnetic disk; wherein
    the magnetic disk and the motor are mounted in the housing member;
    the support arm is freely rotatably mounted in the housing member;
    the suspension has a first mark indicating the mount position of the magnetic head slider, and a second mark set at any different position from the first mark; and
    the cover member has a measuring hole through which the first and the second marks are observed from the opposite side to the support arm mount surface.

2. The magnetic disk drive device according to claim 1, wherein a positioning hole into which a positioning pin is inserted is formed in each of the cover member and the suspension.

3. The magnetic disk drive device according to claim 1, wherein the positioning hole of the cover member is sealed in a completed product.

4. The magnetic disk drive device according to claim 3, wherein the positioning hole of the cover member is formed at any position within a rotatable range of the suspension supported on the support arm so as to face the positioning hole of the suspension.

5. The magnetic disk drive device according to claim 4, wherein the measuring hole is formed at a position at which the first mark and the second mark can be observed from the opposite side to the support arm mount surface under the state that the positioning holes of the cover member and the suspension are arranged so as to face each other and the positioning pin is inserted in each of the positioning hole.

6. The magnetic disk drive device according to claim 1, wherein the first mark is a dimple formed on the suspension, and the second mark is a through hole formed in the suspension.

7. The magnetic disk drive device according to claim 1, wherein the measuring hole is constructed by a first measuring hole through which the first mark is observed from the opposite side to the support arm mount surface, and a second measuring hole through which the second mark is observed from the opposite side to the support arm mount surface.

8. The magnetic disk drive device according to claim 1, wherein the measuring hole is constructed by an elongated common measuring hole through which the first and the second marks are observed from the opposite side to the support arm mount surface.

9. The magnetic disk drive device according to claim 1, wherein the measuring hole is sealed in a completed product.

10. A method of manufacturing a magnetic disk drive, comprising:
    a housing member side assembly step of mounting a magnetic disk and a motor to a housing member;
    a cover member side assembly step of mounting on a cover member a support arm to which a head gimbal assembly in which a magnetic head slider is not mounted is secured;
    a slider mount step of mounting the magnetic head slider in the head gimbal assembly mounted on the cover member; and
    a sealing step of fabricating the cover member to the housing member so that the cover member covers an opening portion of the front surface of the housing member, wherein the slider mount step contains the following first to fourth steps:

first, the support arm to which the head gimbal assembly in which the magnetic head slider is not mounted is secured is fixed at any position preset on the cover member;

secondly, the first and the second marks set in the suspension are measured through the measuring hole from the opposite side to the support arm mount surface on the cover member;

thirdly, the orientation of the suspension and the mount position of the magnetic head slider on the suspension concerned are recognized on the basis of the measurement result of the first and second marks; and fourthly, the magnetic head slider is mounted on the suspension on the basis of the mount position of the magnetic head slider on the orientation of the suspension and the mount position of the magnetic head slider on the suspension.

11. The magnetic disk drive device manufacturing method according to claim 10, wherein the first and the second marks set on the suspension are detected by an image reading camera set up at the opposite side to the support arm mount surface of the cover member.

12. The magnetic disk drive device manufacturing method according to claim 11, wherein before the magnetic head slider is mounted on the suspension, the magnetic head slider is detected by the image reading camera, the orientation and position of the magnetic head slider are recognized, and the magnetic head slider is mounted on the suspension on the basis of the recognition result.

13. The magnetic disk drive device manufacturing method according to claim 10, wherein the magnetic head slider is mounted on the suspension by solder.

* * * * *